(12) United States Patent
Kimba Dit Adamou et al.

(10) Patent No.: US 11,140,570 B2
(45) Date of Patent: Oct. 5, 2021

(54) METHOD AND DEVICE OF PROCESSING ABNORMALITY CONFIGURATION OF MINIMIZATION OF DRIVE-TEST

(71) Applicant: VIVO MOBILE COMMUNICATION CO.,LTD., Guangdong (CN)

(72) Inventors: Boubacar Kimba Dit Adamou, Chang'an Dongguan (CN); Qian Zheng, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/766,622

(22) PCT Filed: Nov. 22, 2018

(86) PCT No.: PCT/CN2018/116911
§ 371 (c)(1),
(2) Date: May 22, 2020

(87) PCT Pub. No.: WO2019/101124
PCT Pub. Date: May 31, 2019

(65) Prior Publication Data
US 2021/0006996 A1    Jan. 7, 2021

(30) Foreign Application Priority Data
Nov. 22, 2017    (CN) .......................... 201711173413.X

(51) Int. Cl.
*H04W 24/10*    (2009.01)
*H04W 24/02*    (2009.01)
*H04W 84/04*    (2009.01)

(52) U.S. Cl.
CPC ........... *H04W 24/10* (2013.01); *H04W 24/02* (2013.01); *H04W 84/042* (2013.01)

(58) Field of Classification Search
CPC ... H04W 24/10; H04W 24/02; H04W 84/042; H04W 16/00
See application file for complete search history.

(56) References Cited

U.S. PATENT DOCUMENTS 9,220,028 B2 * 12/2015 Suzuki ................. H04W 24/10
2011/0201279 A1    8/2011 Suzuki et al.
(Continued)

FOREIGN PATENT DOCUMENTS

CN    102695181 A    9/2012
CN    102761821 A    10/2012
(Continued)

OTHER PUBLICATIONS

3rd Generation Partnership Project, Technical Specification Group Services and System Aspects, Telecommunication Management, Subscriber and equipment trace, Trace control and configuration management, 3GPP TS 34.422 V15.0.0, Sep. 2017.
(Continued)

*Primary Examiner* — Minjung Kim
(74) *Attorney, Agent, or Firm* — Maschoff Brennan

(57) ABSTRACT

A method and a device of processing abnormality configuration of MDT are provided. The method includes receiving first information related to MDT-measurement configuration sent by a network operation-administration-and-management entity or a network node of a core network, wherein the first information related to MDT-measurement configuration includes at least MDT-tracking report information; activating an MDT-measurement execution object to perform MDT measurement if the MDT-measurement execution object satisfies an MDT measurement condition in the MDT-tracking report information; not activating the MDT-measurement execution object to perform MDT measurement if the MDT-measurement execution object does not satisfy the
(Continued)

MDT measurement condition in the MDT-tracking report information.

14 Claims, 5 Drawing Sheets

(56) References Cited

U.S. PATENT DOCUMENTS

| | | | |
|---|---|---|---|
| 2013/0114446 A1* | 5/2013 | Liu | H04W 24/10 370/252 |
| 2013/0178211 A1* | 7/2013 | Wang | H04W 24/02 455/436 |
| 2014/0022910 A1 | 1/2014 | Zhang et al. | |
| 2014/0098690 A1* | 4/2014 | Siomina | H04B 17/309 370/252 |
| 2014/0155056 A1 | 6/2014 | Jactat et al. | |
| 2014/0213194 A1* | 7/2014 | Feng | H04W 24/10 455/67.11 |
| 2014/0235271 A1 | 8/2014 | Jung et al. | |
| 2015/0208197 A1 | 7/2015 | Keskitalo et al. | |
| 2015/0230104 A1* | 8/2015 | Liu | H04W 8/20 455/418 |
| 2016/0080959 A1 | 3/2016 | Kim et al. | |
| 2016/0081012 A1 | 3/2016 | Zhao et al. | |

FOREIGN PATENT DOCUMENTS

| | | |
|---|---|---|
| CN | 102892129 A | 1/2013 |
| CN | 103167533 A | 6/2013 |
| CN | 103200579 A | 7/2013 |
| CN | 107333279 A | 11/2017 |
| WO | 2014178643 A1 | 11/2014 |

OTHER PUBLICATIONS

Release 13 Analytical View Version, 3GPP TSG CT Meeting #69, RP-151569, Phoenix, Arizona, USA, Sep. 14-15, 2015.
Chinese Office Action issued in corresponding application No. 201711173413.X, dated Mar. 3, 2020.
Chinese Office Action issued in corresponding application No. 201711173413.X, dated Jul. 31, 2020.
Chinese Search Report issued in corresponding application No. 201711173413.X, dated Mar. 12, 2020.
European Search Report issued in corresponding application No. 18881846.2, dated Oct. 26, 2020.
PCT International Search Report and Written Opinion issued in corresponding application No. PCT/CN2018/116911, dated Jun. 4, 2020.

* cited by examiner

METHOD AND DEVICE OF PROCESSING ABNORMALITY CONFIGURATION OF MINIMIZATION OF DRIVE-TEST

CROSS-REFERENCE TO RELATED APPLICATION

This application is a U.S. national phase application of a PCT Application No. PCT/CN2018/116911 filed on Nov. 22, 2018, which claims a priority to Chinese Patent Application No. 201711173413.X filed in China on Nov. 22, 2017, the disclosures of which are incorporated in their entirety by reference herein.

TECHNICAL FIELD

The present disclosure relates to the field of wireless communication technology, and more particularly, relates to a method and a device of processing abnormality configuration of minimization of drive-test.

BACKGROUND

In current network optimization of a mobile communication system, a drive-test is usually adopted to check whether a coverage quality of a network and system performance meet expected requirements of a design, that is, professional network-optimization personnel drive a measurement vehicle to move at random, during which a measurement terminal records an event and a measurement variable to be provided to an operator for decision-making of network-optimization. This drive-test is done manually and needs to invest a lot of manpower and time, which brings a great burden to network construction and a maintenance cost of the operator. On the other hand, the drive-test is often carried out only outdoors, and cannot be carried out indoors and in some private areas, and network optimization in these places is difficult to be completed through the drive-test.

A Long Term Evolution (LTE) system of a Fourth Generation (4G) communication proposes a research of Minimization of Drive-Test (MDT). The MDT is a technique by which a communication system automatically collects and analyzes a measurement report of a User Equipment (UE) including location information, and is used to minimize a workload of a manual drive-test.

An evolved LTE (eLTE) and New Radio (NR) in a Fifth Generation (5G) communication have also been provided with the MDT. It is still under research how to handle abnormal configuration of the MDT in the eLTE and the 5G NR.

SUMMARY

The embodiments of the present disclosure provide a method and a device of processing abnormality configuration of Minimization of Drive-Test (MDT), so as to propose a solution for abnormality in configuring the MDT, and improve the effectiveness of configuring the MDT.

In order to solve the above technical problems, in a first aspect, some embodiments of the present disclosure provides a method of processing abnormality configuration of MDT, the method is applied to a base station and includes: receiving first information related to MDT-measurement configuration sent by a network operation-administration-and-management entity or a network node of a core network, wherein the first information related to MDT-measurement configuration includes at least MDT-tracking report information; activating an MDT-measurement execution object to perform MDT measurement if the MDT-measurement execution object satisfies an MDT measurement condition in the MDT-tracking report information; not activating the MDT-measurement execution object to perform MDT measurement if the MDT-measurement execution object does not satisfy the MDT measurement condition in the MDT-tracking report information; wherein the MDT-measurement execution object includes the base station and/or a user equipment (UE).

In a second aspect, some embodiments of the present disclosure provide a base station. The base station includes: a receiving module used for receiving first information related to Minimization of Drive-Test (MDT)-measurement configuration sent by a network operation-administration-and-management entity or a network node of a core network, wherein the first information related to MDT-measurement configuration includes at least MDT-tracking report information; a processing module used for, if an MDT-measurement execution object satisfies an MDT measurement condition in the MDT-tracking report information, activating the MDT-measurement execution object to perform MDT measurement; if the MDT-measurement execution object does not satisfy the MDT measurement condition in the MDT-tracking report information, not activating the MDT-measurement execution object to perform the MDT measurement, wherein the MDT-measurement execution object includes the base station and/or a user equipment.

In a third aspect, some embodiments of the present disclosure provide a base station. The base station includes a processor, a storage, and a computer program stored on the storage and executable by the processor, wherein when the computer program is executed by the processor, the processor implements steps of the method of processing abnormality configuration of Minimization of Drive-Test (MDT) described above.

In a fourth aspect, some embodiments of the present disclosure provide a computer readable storage medium, wherein a computer program is stored on the computer readable storage medium, wherein when the computer program is executed by a processor, the processor implements steps of the method of processing abnormality configuration of MDT described above.

BRIEF DESCRIPTION OF THE DRAWINGS

In order to more clearly explain technical solutions of the embodiments of the present disclosure, accompany drawings used in description of the embodiments of the present disclosure will be briefly described below, and it will be apparent that the drawings in the following description are only a part, rather than all, of the embodiments of the present disclosure, and those of ordinary skill in the art may obtain other drawings from these drawings without paying creative labor.

DETAILED DESCRIPTION

To make objectives, technical solutions and advantages of the embodiments of the present disclosure more clear, the technical solutions of the embodiments of the present disclosure will be clearly and completely described below in conjunction with the drawings of the embodiments of the present disclosure. It will be apparent that the described embodiments are a part, rather than all, of the embodiments of the present disclosure. Based on the described embodiments of the present disclosure, all other embodiments obtained by those of ordinary skill in the art are within the protection scope of the present disclosure.

Figure 1:
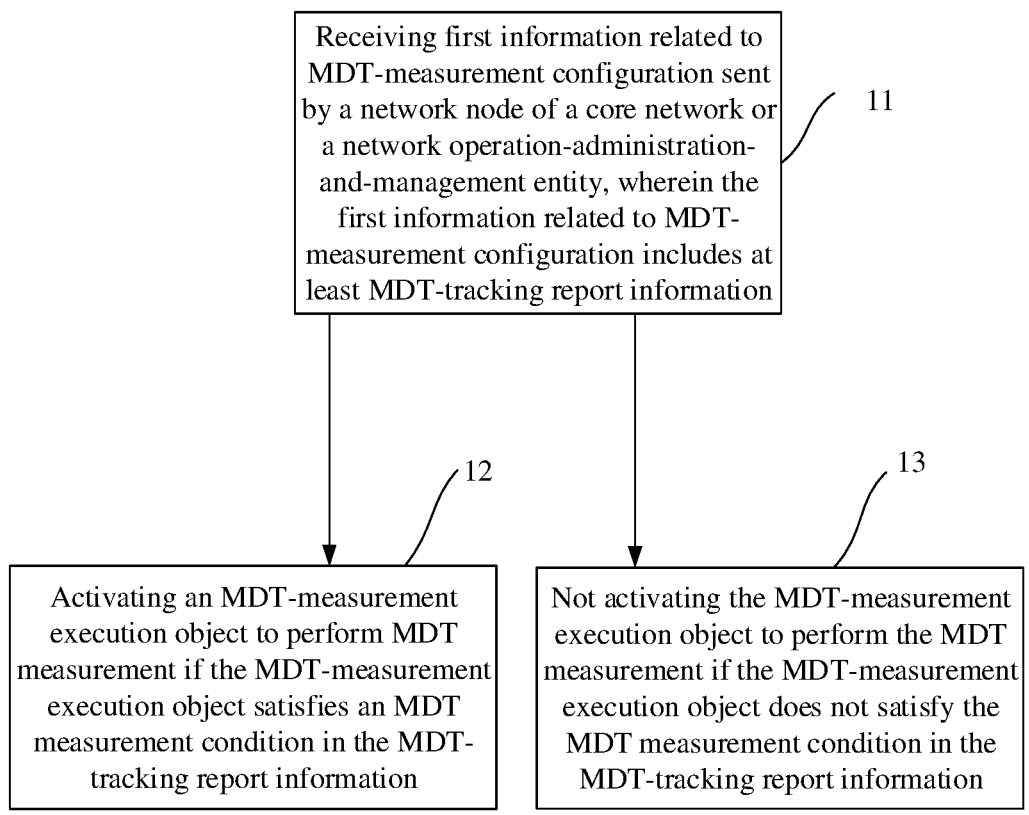
FIG. 1 is a flow chart of a method of processing abnormality configuration of minimization of drive-test according to a first embodiment of the present disclosure.

Referring to FIG. 1, a first embodiment of the present disclosure provides a method of processing abnormality configuration of minimization of drive-test, which is applied to a base station. The method of processing abnormality configuration of minimization of drive-test includes steps 11-13.

Step 11: receiving first information related to MDT-measurement configuration sent by a network node of a core network or a network operation-administration-and-management entity, wherein the first information related to MDT-measurement configuration includes at least MDT-tracking report information.

Step 12: if an MDT-measurement execution object satisfies an MDT measurement condition in the MDT-tracking report information, activating the MDT-measurement execution object to perform MDT measurement, wherein the MDT-measurement execution object includes a base station and/or a user equipment.

Step 13: if the MDT-measurement execution object does not satisfy the MDT measurement condition in the MDT-tracking report information, not activating the MDT-measurement execution object to perform the MDT measurement.

In the embodiment of the present disclosure, after a base station receives the first information related to MDT-measurement configuration including at least the MDT-tracking report information, the base station first determines whether or not the MDT-measurement execution object needing to perform MDT measurement satisfies the MDT measurement condition in the MDT-tracking report information. If satisfies, then the MDT-measurement execution object is activated to perform MDT measurement; otherwise the MDT-measurement execution object is not activated to perform MDT measurement, rather than directly activating the MDT-measurement execution object to perform the MDT measurement after receiving the first information related to MDT-measurement configuration. In this way, a useless operation is avoided, a method of configuring MDT in eLTE and 5G NR is perfected, and effectiveness of configuring MDT is improved.

Of course, the method of processing abnormality configuration of minimization of drive-test in the embodiment of the present disclosure is also not limited to be applied to the eLTE and the 5G NR, and may be applied to other communication network systems in the future.

A network node may be a User Data Management (UDM) entity, a Session Management Function (SMF) entity, or an Access and Mobility Management Function (AMF) entity in a case that the method of processing abnormality configuration of minimization of drive-test in the embodiments of the present disclosure is applied to the 5G system.

In some embodiments of the present disclosure, the first information related to MDT-measurement configuration may include MDT-tracking report information and indication information of activating the MDT-tracking report information, wherein the MDT-tracking report information is used to configure a related parameter of MDT measurement for the MDT-measurement execution object, and the indication information of activating the MDT-tracking report information is used to activate the MDT-measurement execution object to perform MDT measurement according to the MDT-tracking report information.

In the embodiments of the present disclosure, when the network operation-administration-and-management entity or the network node of the core network needs to perform MDT measurement, the MDT-tracking report information and the indication information of activating the MDT-tracking report information may be simultaneously sent to the base station through a signaling; or the MDT-tracking report information is sent first to the base station through a signaling, and when MDT measurement is required to be performed, the indication information of activating the MDT-tracking report information is sent to the base station through a signaling.

In other embodiments of the present disclosure, the first information related to MDT-measurement configuration may also include only the MDT-tracking report information, wherein the MDT-tracking report information is used to configure a related parameter of MDT measurement for the MDT-measurement execution object and activate the MDT-measurement execution object to perform MDT measurement according to the MDT-tracking report information.

In the embodiments of the present disclosure, before the base station determines whether or not the MDT-measurement execution object satisfies the MDT measurement condition in the MDT-tracking report information, the method further includes: determining the MDT-measurement execution object according to the MDT-tracking report information.

In the embodiments of the present disclosure, the MDT-tracking report information may include at least one of following parameters:

1) an MDT measurement type, where the MDT measurement type includes Logged MDT or Immediate MDT.

2) an MDT measurement area parameter, i.e. which areas need to activate MDT measurement. The MDT measurement area parameter may include a network slice list (slice list), an access paging area (RAN paging area), an access notification area (RAN notification area), an access location area (RAN Location Area), and a system message active area (System information area), a core network tracking area (CN tracking area), or network cell information, such as a cell PCI.

3) a measurement list, wherein the measurement list may include:

31) a UE measurement list, wherein the UE measurement list may include at least one of following parameters:

a Power headroom (PH);

a Reference Signal Receiving Power (RSRP)/Reference Signal Receiving Quality (RSRQ)/Signal to Interference plus Noise Ratio (SINR) of a Synchronization Signal (SS) block, a Primary Synchronization Signal (PSS), a Secondary Synchronization Signal (SSS) and a related Physical Broadcast Channel (PBCH) of the SS block;

measurement of the PSS and the SSS, which may include a beam time index;

measurement of the PBCH, which may include measurement of a Demodulation Reference Signal (DMRS) and related beam information;

measurement of RSRP/RSRQ/SINR of a Channel State Information Reference Signal (CSI-RS);

measurement information of a Tracking RS (TRS)/Phase-tracking RS (PTRS).

32) a base-station measurement list, wherein the base-station measurement list may include at least one of following parameters:

Received Interference Power (RIP) measurement;

Data Volume (DV) measurement, including downlink (DL) measurement and/or uplink (UL) measurement;

Scheduled IP Throughput (SIT).

4) a condition for reporting MDT measurement, including reporting by a UE and/or a base station.

5) a time interval at which MDT measurement is reported.

6) a quantity of MDT measurement reported.

7) an event threshold, such as thresholds of the RSRP and/or the RSRQ, and the like.

8) an interval at which MDT measurement is recorded.

9) a time duration for which MDT measurement is recorded.

10) Trace Reference.

11) an IP address of a Trace Collection Entity (TCE) of MDT.

12) anonymization of MDT data.

13) a measurement period, such as periods of DV measurement and/or SIT measurement.

14) a measurement period of Radio Resource Management (RRM), such as periods of PH measurement and/or RIP measurement.

15) a positioning method, including Global Positioning System (GPS), Observed Time Difference of Arrival (OT-DOA), etc.

16) an MDT Public Land Mobile Network (PLMN) list.

When the MDT-tracking report information includes the UE measurement list, the base station determines that the MDT-measurement execution object includes a user equipment, and when the MDT-tracking report information includes the base-station measurement list, the base station determines the MDT-measurement execution object includes the base station per se.

In some embodiments of the present disclosure, when the MDT-measurement execution object includes the base station, MDT measurement performed by the base station is activated if the base station satisfies the MDT measurement condition in the MDT-tracking report information. If the base station does not satisfy the MDT measurement condition in the MDT-tracking report information, the MDT measurement performed by the base station is not activated.

In some embodiments of the present disclosure, when the MDT-measurement execution object includes a user equipment, second information related to MDT-measurement configuration is sent to the user equipment if the user equipment satisfies the MDT measurement condition in the MDT-tracking report information; if the user equipment does not satisfy the MDT measurement condition in the MDT-tracking report information, the second information related to MDT-measurement configuration is not sent to the user equipment.

In some embodiments of the present disclosure, the second information related to MDT-measurement configuration may include the MDT-measurement configuration information and indication information of activating the MDT measurement, wherein the MDT-measurement configuration information is used to configure the related parameter of MDT measurement for the user equipment. The indication information of activating the MDT measurement is used to activate the user equipment to perform the MDT measurement.

In the embodiments of the present disclosure, when the MDT measurement need to be performed, the base station may simultaneously send the MDT-measurement configuration information and the indication information of activating the MDT measurement to the user equipment through one signaling; or the base station may first send the MDT-measurement configuration information to the user equipment through one signaling, and when MDT measurement needs to be performed, the base station may send the indication information of activating MDT measurement to the user equipment through one signaling.

In some other embodiments of the present disclosure, the second information related to MDT-measurement configuration may also include only the MDT-measurement configuration information, wherein the MDT-measurement configuration information is used to configure a related parameter of the MDT measurement for the user equipment and activate the user equipment to perform MDT measurement.

In the embodiments of the present disclosure, optionally, the step of sending the second information related to MDT-measurement configuration to the user equipment includes sending the second information related to MDT-measurement configuration to the user equipment when the user equipment is in a non-idle state, wherein the non-idle state includes an RRC connection state, an RRC inactive (INACTIVE) state, a state of initiating an RRC recovery request, a state of initiating a service request, a state of initiating an access notification area (RNA) update state, and a state of initiating a tracking area update state.

That is, only when the user equipment is in the non-idle state, the second information related to MDT-measurement configuration is sent to the user equipment; when the user equipment is in the idle state, the second information related to MDT-measurement configuration is not sent to the user equipment.

In some embodiments of the present disclosure, optionally, when the MDT-measurement execution object includes a user equipment, the MDT measurement condition may include at least one of following: whether or not the user equipment supports the UE measurement list in the MDT-tracking report information; whether or not the user equipment is in an area specified by an MDT measurement area parameter in the MDT-tracking report information; whether or not a PLMN selected by the user equipment is in an MDT PLMN list in the MDT-tracking report information; whether or not the user equipment supports an MDT measurement type in the MDT-tracking report information; whether or not a location of the user equipment is within a service range of the base station.

In some embodiments of the present disclosure, when the MDT-measurement execution object includes the base station, the MDT measurement condition includes whether or not the base station supports the base-station measurement list in the MDT-tracking report information.

Figure 2:
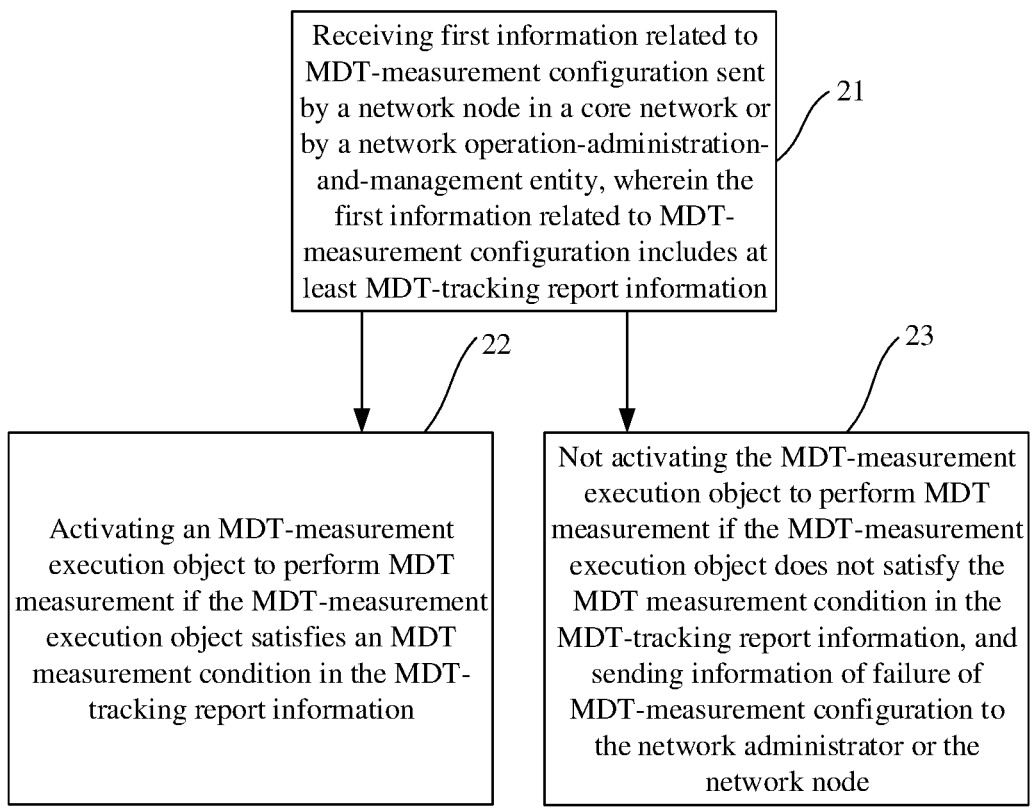
FIG. 2 is a flow chart of a method of processing abnormality configuration of minimization of drive-test according to a second embodiment of the present disclosure.

Referring to FIG. 2, a second embodiment of the present disclosure provides a method of processing abnormality configuration of minimization of drive-test (MDT). The method is applied to a base station, and the method of processing abnormality configuration of minimization of drive-test includes steps 21-23.

Step 21: receiving first information related to MDT-measurement configuration sent by a network node in a core network or by a network operation-administration-and-management entity, wherein the first information related to MDT-measurement configuration includes at least MDT-tracking report information.

Step 22: activating the MDT-measurement execution object to perform MDT measurement if the MDT-measurement execution object satisfies an MDT measurement condition in the MDT-tracking report information, wherein the MDT-measurement execution object includes the base station and/or a user equipment.

Step 23: not activating the MDT-measurement execution object to perform MDT measurement if the MDT-measurement execution object does not satisfy the MDT measurement condition in the MDT-tracking report information, and sending information of failure of MDT-measurement configuration to the network operation-administration-and-management entity or the network node.

In the embodiments of the present disclosure, if the base station determines that the MDT-measurement execution object does not satisfy the MDT measurement condition in the MDT-tracking report information, the base station sends the information of failure of MDT-measurement configuration to the network operation-administration-and-management entity or the network node, thus the network operation-administration-and-management entity or the network node may know a situation of the MDT-measurement configuration in time and make adjustment.

In the embodiments of the present disclosure, optionally, the step of sending information of failure of MDT-measurement configuration to the network operation-administration-and-management entity or the network node includes: acquiring a cause for the failure of MDT-measurement configuration, and sending the information of the failure of MDT-measurement configuration to the network operation-administration-and-management entity or the network node, wherein the information of the failure of MDT-measurement configuration carries the cause for the failure of MDT-measurement configuration, the cause for the failure of MDT-measurement configuration failure includes a cause for failure of MDT-measurement configuration of a base station and/or a cause for failure of MDT-measurement configuration of a user equipment. Thus, the network operation-administration-and-management entity or the network node can understand the cause for the failure of the MDT-measurement configuration, and make a corresponding adjustment according to the cause of the failure.

Figure 3:
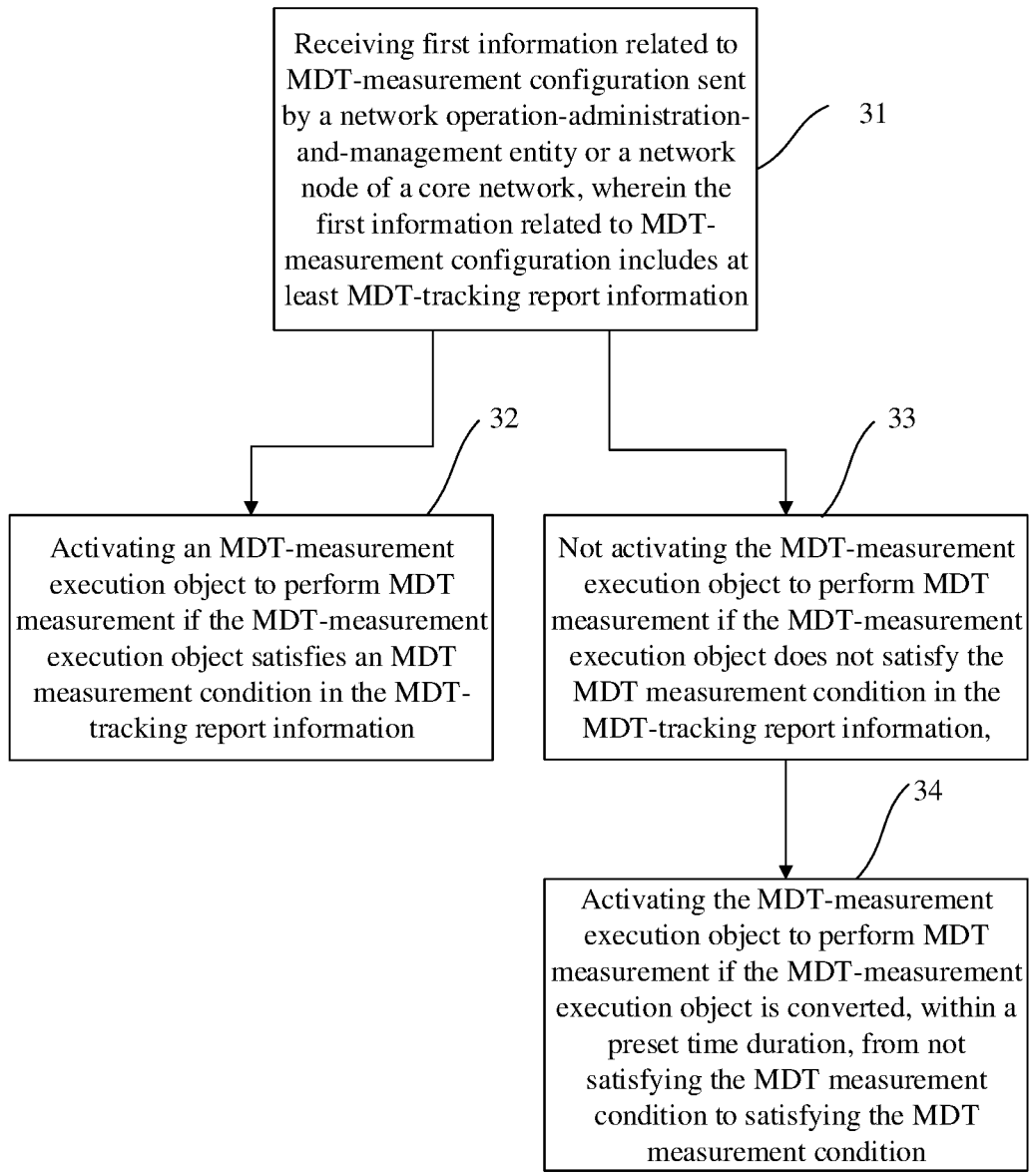
FIG. 3 is a flow chart of a method of processing abnormality configuration of minimization of drive-test according to a third embodiment of the present disclosure.

Referring to FIG. 3, a third embodiment of the present disclosure provides a method of processing abnormality configuration of minimization of drive-test (MDT). The method is applied to a base station, and the method of processing abnormality configuration of MDT includes steps 31-34.

Step 31: receiving first information related to MDT-measurement configuration sent by a network operation-administration-and-management entity or a network node of a core network, wherein the first information related to MDT-measurement configuration includes at least MDT-tracking report information.

Step 32: activating an MDT-measurement execution object to perform MDT measurement if the MDT-measurement execution object satisfies an MDT measurement condition in the MDT-tracking report information, wherein the MDT-measurement execution object includes the base station and/or a user equipment.

Step 33: not activating the MDT-measurement execution object to perform MDT measurement if the MDT-measurement execution object does not satisfy the MDT measurement condition in the MDT-tracking report information.

Step 34: activating the MDT-measurement execution object to perform MDT measurement if the MDT-measurement execution object is converted, within a preset time duration, from not satisfying the MDT measurement condition to satisfying the MDT measurement condition.

In the embodiments of the present disclosure, the preset time duration may be configured by the base station itself or by the network operation-administration-and-management entity or the network node.

In the embodiments of the present disclosure, if the base station determines that the MDT-measurement execution object does not satisfy the MDT measurement condition in the MDT-tracking report information, the base station continues to determine whether or not the MDT-measurement execution object satisfies the MDT measurement condition in the MDT-tracking report information. If the MDT-measurement execution object is changed, within a preset time duration, to satisfy the MDT measurement condition, the MDT-measurement execution object can still be activated to perform MDT measurement, thereby increasing a successful probability of MDT-measurement configuration.

Figure 4:
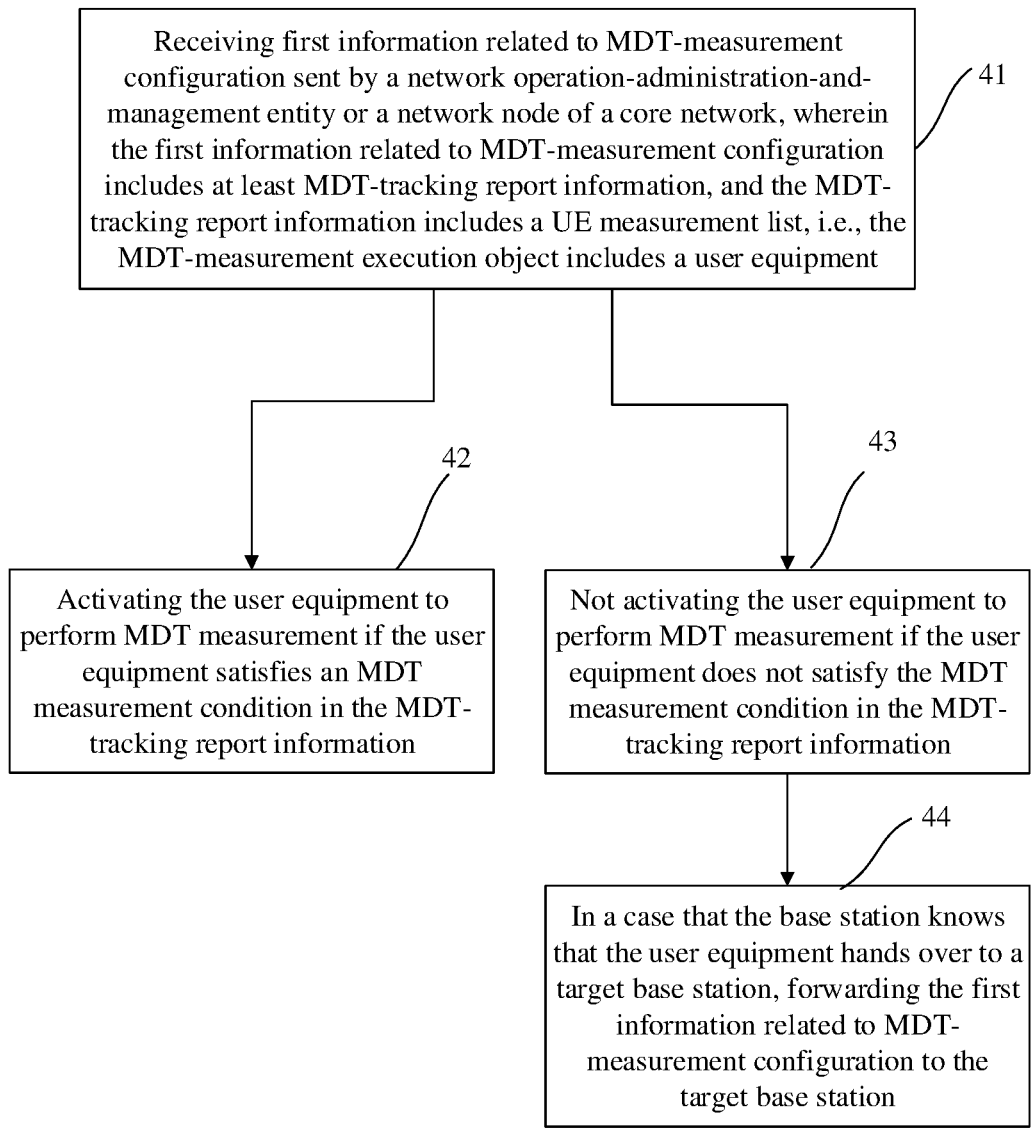
FIG. 4 is a flow chart of a method of processing abnormality configuration of minimization of drive-test according to a fourth embodiment of the present disclosure.

Referring to FIG. 4, a fourth embodiment of the present disclosure provides a method of processing abnormality configuration of minimization of drive-test (MDT). The method is applied to a base station, and the method of processing abnormality configuration of MDT includes steps 41-44:

Step 41: receiving first information related to MDT-measurement configuration sent by a network operation-administration-and-management entity or a network node of a core network, wherein the first information related to MDT-measurement configuration includes at least MDT-tracking report information, and the MDT-tracking report information includes a UE measurement list, i.e., the MDT-measurement execution object includes a user equipment.

Step 42: activating the user equipment to perform MDT measurement if the user equipment satisfies an MDT measurement condition in the MDT-tracking report information.

Step 43: if the user equipment does not satisfy the MDT measurement condition in the MDT-tracking report information, not activating the user equipment to perform MDT measurement.

Step 44: in a case that the base station knows that the user equipment hands over to a target base station, forwarding the first information related to MDT-measurement configuration to the target base station.

In the embodiments of the present disclosure, if the base station determines that the user equipment does not satisfy the MDT measurement condition and a cause for not satisfying the MDT measurement condition is that the user equipment hands over from a current base station to a target base station, the base station may forward the first information related to MDT-measurement configuration to the target base station so that the target base station may activate the user equipment to perform MDT measurement.

In the embodiments of the present disclosure optionally, after the step of forwarding the first information related to MDT-measurement configuration to the target base station, the method further includes sending, by the base station to the network operation-administration-and-management entity or the network node, information of failure of MDT-measurement configuration and information of forwarding the first information related to MDT-measurement configuration to the target base station, wherein the information of failure of MDT-measurement configuration carries a cause for failure of MDT-measurement configuration, so that the network operation-administration-and-management entity or the network node may learn the cause for the failure of MDT-measurement configuration, and make timely adjustment according to the cause for the failure.

In a case that the base station in the embodiments of the present disclosure is a centralized unit (CU)-distributed unit (DU) type base station, optionally, if the user equipment is determined as not satisfying the MDT measurement condition in the MDT-tracking report information, the method further includes: if the base station knows that the user equipment hands over from an original DU to a target DU, performing following operations: resending the first information related to MDT-measurement configuration to the user equipment by a CU corresponding to the base station within a coverage area of the target DU; or, forwarding the first information related to MDT-measurement configuration to the target DU by the CU, so that the target DU sends second information related to MDT-measurement configuration to the user equipment; or forwarding the first information related to MDT-measurement configuration to the target DU by the original DU, so that the target DU sends the second information related to MDT-measurement configuration to the user equipment.

Since the above operations are performed, even if the user equipment hands over to another DU, the MDT-measurement configuration goes on without being affected.

In some embodiments of the present disclosure, optionally, if the user equipment does not satisfy the MDT measurement condition in the MDT-tracking report information, the method further includes: sending, to the network operation-administration-and-management entity or the network node by the CU or the original DU, information of failure of MDT-measurement configuration and information of forwarding the first information related to MDT-measurement configuration to the target DU, wherein the information of failure of MDT-measurement configuration carries a cause for the failure of MDT-measurement configuration.

Figure 5:
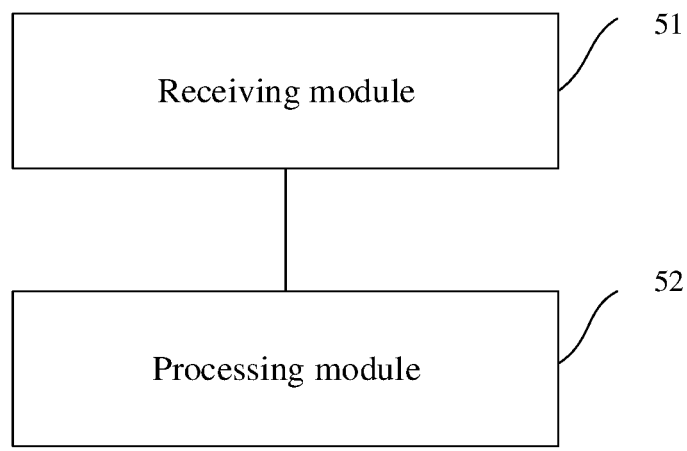
FIG. 5 is a schematic structural diagram of a base station according to a fifth embodiment of the present disclosure.

Based on the same inventive concept, referring to FIG. 5, a fifth embodiment of the present disclosure further provides a base station 50. The base station 50 includes a receiving module 51 and a processing module 52.

The receiving module 51 is used for receiving first information related to MDT-measurement configuration sent by a network node of a core network or a network operation-administration-and-management entity, wherein the first information related to MDT-measurement configuration includes at least MDT-tracking report information.

The processing module 52 is used for, if an MDT-measurement execution object satisfies an MDT measurement condition in the MDT-tracking report information, activating the MDT-measurement execution object to perform MDT measurement; if the MDT-measurement execution object does not satisfy the MDT measurement condition in the MDT-tracking report information, not activating the MDT-measurement execution object to perform the MDT measurement, wherein the MDT-measurement execution object includes the base station and/or a user equipment.

In the embodiments of the present disclosure, after the base station 50 receives the first information related to MDT-measurement configuration, the base station first determines whether or not the MDT-measurement execution object needing to perform MDT measurement satisfies the MDT measurement condition in the MDT-tracking report information. If satisfies, then the MDT-measurement execution object is activated to perform MDT measurement; otherwise the MDT-measurement execution object is not activated to perform MDT measurement, rather than directly activating the MDT-measurement execution object to perform the MDT measurement after receiving the first information related to MDT-measurement configuration. In this way, a useless operation is avoided, a method of configuring MDT in eLTE and 5G NR is perfected, and effectiveness of configuring MDT is improved.

Optionally, when the MDT-measurement execution object includes the base station, the processing module 52 is used for activating MDT measurement performed by the base station if the base station satisfies the MDT measurement condition in the MDT-tracking report information; not activating the MDT measurement performed by the base station if the base station does not satisfy the MDT measurement condition in the MDT-tracking report information.

Optionally, when the MDT-measurement execution object includes a user equipment, the processing module 53 is used for sending second information related to MDT-measurement configuration the user equipment if the user equipment satisfies the MDT measurement condition in the MDT-tracking report information; not sending the second information related to MDT-measurement configuration to the user equipment if the user equipment does not satisfy the MDT measurement condition in the MDT-tracking report information.

Optionally, when the MDT-measurement execution object includes a user equipment, the MDT measurement condition includes at least one of following: whether or not the user equipment supports the UE measurement list in the MDT-tracking report information; whether or not the user equipment is in an area specified by an MDT measurement area parameter in the MDT-tracking report information; whether or not a PLMN selected by the user equipment is in an MDT PLMN list in the MDT-tracking report information; whether or not the user equipment supports an MDT measurement type in the MDT-tracking report information; whether or not a location of the user equipment is within a service range of the base station.

Optionally, when the MDT-measurement execution object includes the base station, the MDT measurement condition includes whether or not the base station supports the base-station measurement list in the MDT-tracking report information.

Optionally, the base station of the embodiment of the present disclosure further includes a first sending module used for sending information of failure of MDT-measurement configuration to the network operation-administration-and-management entity or the network node.

Optionally, the first sending module is used for acquiring a cause for the failure of MDT-measurement configuration, and sending the information of the failure of MDT-measurement configuration to the network operation-administration-and-management entity or the network node, wherein the information of the failure of MDT-measurement configuration carries the cause for the failure of MDT-measurement configuration, the cause for the failure of MDT-measurement configuration failure includes a cause for failure of MDT-measurement configuration of a base station and/or a cause for failure of MDT-measurement configuration of a user equipment.

Optionally, the processing module is used for activating the MDT-measurement execution object to perform MDT measurement if the MDT-measurement execution object is converted, within a preset time duration, from not satisfying the MDT measurement condition to satisfying the MDT measurement condition.

Optionally, the base station of the embodiment of the present disclosure further includes: a forwarding module used for, if the user equipment does not satisfy the MDT measurement condition in the MDT-tracking report information and the base station learns that the user equipment hands over to a target base station, forwarding the MDT-tracking report information to the target base station.

Optionally, the base station of the embodiment of the present disclosure further includes: a second sending module used for sending, to the network operation-administration-and-management entity or the network node, information of failure of MDT-measurement configuration and information of forwarding the MDT-tracking report information to the target base station, wherein the information of failure of MDT-measurement configuration carries a cause for the failure of MDT-measurement configuration.

Optionally, the base station of the embodiment of the present disclosure further includes: a handover processing module used for, if the user equipment does not satisfy the MDT measurement condition in the MDT-tracking report information and the base station knows that the user equipment hands over from the original Distributed Unit (DU) to a target DU, a centralized unit (CU) corresponding to the base station re-sends second information related to MDT-measurement configuration to the user equipment within a coverage area of the target DU; or the original DU or the CU forwards the first information related to MDT-measurement configuration to the target DU, and the target DU sends second information related to MDT-measurement configuration to the user equipment.

Optionally, the base station further includes: a third sending module used for, if the user equipment does not satisfy the MDT measurement condition in the MDT-tracking report information, sending, to the network operation-administration-and-management entity or the network node by the CU or the original DU, information of failure of MDT-measurement configuration and information of forwarding the first information related to MDT-measurement configuration to the target DU, wherein the information of failure of MDT-measurement configuration carries a cause for the failure of MDT-measurement configuration.

Optionally, the network node is a data collection node, a home subscriber server, a user data management entity, a session management function entity, an access and mobility management function entity, or a mobility management entity.

The base station in the embodiments of the present disclosure may be a Base Transceiver Station (BTS) in a Global System of Mobile Communication (GSM) or a Code Division Multiple Access (CDMA) system, or may be a NodeB (NB) in a Wideband Code Division Multiple Access (WCDMA), or may also be an Evolutional Node B (eNB or eNodeB) in a Long Term Evolution (LTE), a relay station or an access point, or a base station in a future 5G network, etc. The present disclosure is not limited thereto.

The embodiments of the present disclosure also provide a base station. The base station includes a processor, a storage, and a computer program stored on the storage and executable by the processor, wherein when the computer program is executed by the processor, the processor implements the steps of the method of processing abnormality configuration of minimization of drive-test.

The embodiments of the present disclosure also provide a computer readable storage medium having a computer program stored thereon, wherein when the computer program is executed by a processor, the processor implements the steps of the method of processing abnormality configuration of minimization of drive-test. The computer readable storage medium is, for example, a Read-Only Memory (ROM), a Random Access Memory (RAM), a magnetic disk or an optical disc.

Figure 6:
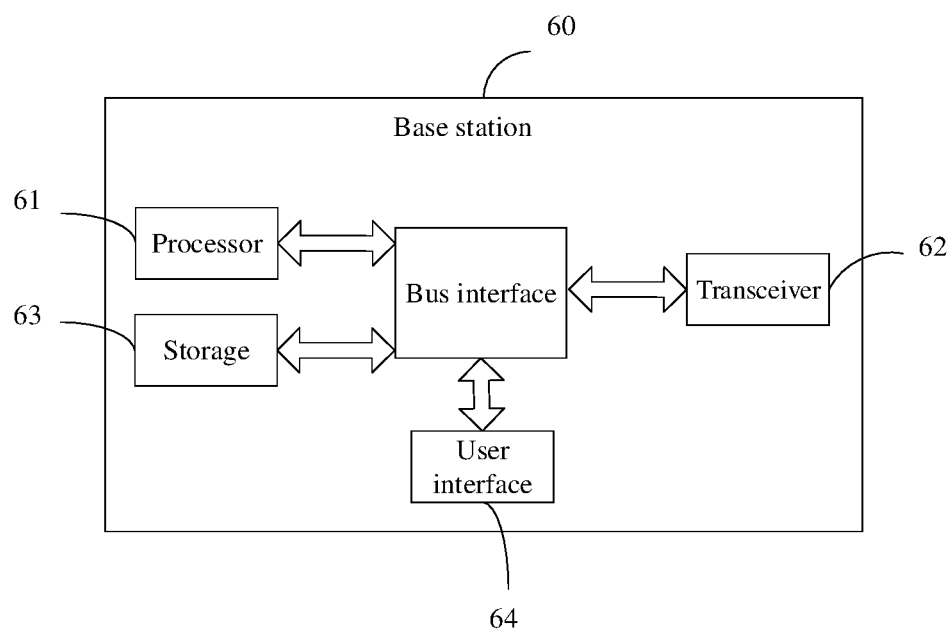
FIG. 6 is a schematic structural diagram of a base station according to a sixth embodiment of the present disclosure.

Referring to FIG. 6, a sixth embodiment of the present disclosure further provides a base station 60. The base station 60 includes a processor 61, a transceiver 62, a storage 63, a user interface 64, and a bus interface, wherein, in the embodiments of the present disclosure, the base station 60 further include a computer program stored on the storage 63 and executable by the processor 61, and when the computer program is executed by the processor 61, the processor 61 implements the following steps: receiving first information related to MDT-measurement configuration sent by a network operation-administration-and-management entity or a network node of a core network, wherein the first information related to MDT-measurement configuration includes at least MDT-tracking report information; activating a MDT-measurement execution object to perform MDT measurement if the MDT-measurement execution object satisfies an MDT measurement condition in the MDT-tracking report information; not activating the MDT-measurement execution object to perform MDT measurement if the MDT-measurement execution object does not satisfy an MDT measurement condition in the MDT-tracking report information; wherein the MDT-measurement execution object includes the base station and/or a user equipment.

In FIG. 6, a bus architecture may include any number of interconnected buses and bridges. Specifically, various circuits such as one or more processors represented by the processor 61 and a storage represented by the storage 63 are linked together. The bus architecture may also link together various other circuits, such as peripheral devices, voltage regulators, and power management circuits, which are well known in the art, and thus will not be described further herein. The bus interface provides an interface. The transceiver 62 may be a plurality of elements, i.e., including a transmitter and a receiver, for providing units for communicating with various other devices over a transmission medium. The user interface 64 may be an interface capable of interfacing with a desired external device including, but not limited to, a keypad, a display, a speaker, a microphone, a joystick, and the like.

The processor 61 is responsible for managing the bus architecture and normal processing, and the storage 63 may store data used by the processor 61 when the processor 61 performs operations.

Optionally, when the MDT-measurement execution object includes a user equipment, the MDT measurement condition includes at least one of following: whether or not the user equipment supports a UE measurement list in the MDT-tracking report information; whether or not the user equipment is in an area specified by an MDT measurement area parameter in the MDT-tracking report information; whether or not a PLMN selected by the user equipment is in an MDT PLMN list in the MDT-tracking report information; whether or not the user equipment supports an MDT measurement type in the MDT-tracking report information; whether or not a location of the user equipment is within a service range of the base station.

Optionally, when the MDT-measurement execution object includes the base station, the MDT measurement condition includes: whether or not the base station supports the base-station measurement list in the MDT-tracking report information.

Optionally, if the MDT-measurement execution object is determined to not satisfy the MDT measurement condition in the MDT-tracking report information, the method further includes: sending information of failure of MDT-measurement configuration to the network operation-administration-and-management entity or the network node.

Optionally, the step of sending the information of failure of MDT-measurement configuration to the network operation-administration-and-management entity or the network node includes: acquiring a cause for the failure of MDT-measurement configuration, and sending the information of the failure of MDT-measurement configuration to the network operation-administration-and-management entity or the network node, wherein the information of the failure of MDT-measurement configuration carries the cause for the failure of MDT-measurement configuration, the cause for the failure of MDT-measurement configuration failure includes a cause for failure of MDT-measurement configuration of the base station and/or a cause for failure of MDT-measurement configuration of a user equipment.

Optionally, if the MDT-measurement execution object does not satisfy the MDT measurement condition in the MDT-tracking report information, the method further includes: activating the MDT-measurement execution object to perform MDT measurement if the MDT-measurement execution object is converted, within a preset time duration, from not satisfying the MDT measurement condition to satisfying the MDT measurement condition.

Optionally, when the computer program is executed by the processor 61, the processor 61 further implements following steps: if the user equipment does not satisfy the MDT measurement condition in the MDT-tracking report information and the base station learns that the user equipment hands over to a target base station, forwarding the MDT-tracking report information to the target base station.

Optionally, when the computer program is executed by the processor 61, the processor 61 further implements following steps: after forwarding the MDT-tracking report information to the target base station, sending, by the base station to the network operation-administration-and-management entity or the network node, information of failure of MDT-measurement configuration and information of forwarding the MDT-tracking report information to the target base station, wherein the information of failure of MDT-measurement configuration carries a cause for failure of MDT-measurement configuration.

Optionally, when the computer program is executed by the processor 61, the processor 61 further implements following steps: if the user equipment does not satisfy the MDT measurement condition in the MDT-tracking report information, and if the base station knows that the user equipment hands over from an original Distributed Unit (DU) to a target DU, resending second information related to MDT-measurement configuration to the user equipment by a CU corresponding to the base station within a coverage area of the target DU; or, forwarding the first information related to MDT-measurement configuration to the target DU by the CU, so that the target DU sends second information related to MDT-measurement configuration to the user equipment.

Optionally, when the computer program is executed by the processor 61, the processor 61 further implements following steps: if the user equipment does not satisfy the MDT measurement condition in the MDT-tracking report information, sending, to the network operation-administration-and-management entity or the network node by the CU or the original DU, information of failure of MDT-measurement configuration and information of forwarding the first information related to MDT-measurement configuration to the target DU, wherein the information of failure of MDT-measurement configuration carries a cause for the failure of MDT-measurement configuration.

Optionally, the network node is a data collection node, a home subscriber server, a user data management entity, a session management function entity, an access and mobility management function entity, or a mobility management entity.

In the embodiments of the present disclosure, after the first information related to MDT-measurement configuration is received, first it needs to determine whether or not the MDT-measurement execution object needing to perform MDT measurement satisfies the MDT measurement condition in the MDT-tracking report information. If satisfies, then the MDT-measurement execution object is activated to perform MDT measurement; otherwise the MDT-measurement execution object is not activated to perform MDT measurement. In this way, a useless operation is avoided, a method of configuring MDT in eLTE and 5G NR is perfected, and effectiveness of configuring MDT is improved.

Those of ordinary skill in the art will appreciate that units and algorithm steps in examples described in connection with the embodiments disclosed herein can be implemented in electronic hardware, or a combination of computer software and electronic hardware. Whether these functions are executed in hardware or software depends on a specific application and design constraints of the technical solutions. One skilled in the art may use different methods to implement the described functions for each particular application, but such implementations should not be considered to go beyond the scope of the present disclosure.

It will be apparent to those skilled in the art that for convenience and brevity of description, a specific operation process of systems, devices and units described above may be obtained by referring to a corresponding process in the foregoing method embodiments, which will not be described in details.

In the embodiments provided herein, it should be understood that the disclosed device and method may be implemented in other ways. For example, the device embodiments described above are merely illustrative, for example, division made to units is only a logical functional division, and there may be another division in actual implementation, such as a plurality of units or components may be combined or may be integrated into another system, or some features may be ignored or may not be performed. Additionally, coupling or direct coupling or communication connection of components shown or discussed may be an indirect coupling or communication connection through some interfaces, devices, or units, and may be in electrical, mechanical, or other form.

Elements described as separate elements may or may not be physically separated, and elements displayed as units may be or may not be physical elements, i.e. may be located in one place or may also be distributed into a plurality of network elements. Some or all of the units may be selected according to actual needs to achieve objectives of the solutions of the present disclosure.

In addition, various functional units in the embodiments of the present disclosure may be integrated in one processing unit, may be physical units existing separately, or two or more units may be integrated in one component.

Functions may be stored in a computer readable storage medium if the functions are implemented in a form of software functional units and sold or used as separate products. Based on such an understanding, an essential part, or a part contributing to the related art, or a part, of technical solutions of the present disclosure may be embodied in a form of a computer software product which is stored in a storage medium. The storage medium includes several instruction used to cause a computer device (which may be a personal computer, a server, or a network device, etc.) to perform all or a part of that steps of the method of various embodiments of the present disclosure. The aforementioned storage medium includes a variety of media capable of storing program codes, such as a USB disk, a mobile hard disk, a ROM, a RAM, a magnetic disk, an optical disc, and the like.

The foregoing are only specific embodiments of the present disclosure. The protection scope of the present disclosure is not limited thereto, and any person skilled in the art may readily devise variations or substitutions within the technical scope of the present disclosure, and such variations or substitution shall be covered by the protection scope of the present disclosure. Accordingly, the protection scope of the present disclosure shall be consistent with the protection scope of the claims.

What is claimed is:

1. A method of processing abnormality configuration of Minimization of Drive-Test (MDT), the method being applied to a base station and comprising:
   receiving first information related to MDT-measurement configuration sent by a network operation-administration-and-management entity or a network node of a core network, wherein the first information related to MDT-measurement configuration comprises at least MDT-tracking report information;
   activating an MDT-measurement execution object to perform MDT measurement if the MDT-measurement execution object satisfies an MDT measurement condition;
   not activating the MDT-measurement execution object to perform MDT measurement if the MDT-measurement execution object does not satisfy the MDT measurement condition;
   wherein the MDT-measurement execution object comprises the base station and/or a user equipment (UE), the method further comprises:
   forwarding the MDT-tracking report information to a target base station if the user equipment does not satisfy the MDT measurement condition and the base station knows that the user equipment hands over to the target base station, and
   sending, by the base station to the network operation-administration-and-management entity or the network node, information about failure of MDT-measurement configuration and information about forwarding the MDT-tracking report information to the target base station, wherein the information about failure of MDT-measurement configuration carries a cause for the failure of MDT-measurement configuration.

2. The method of processing abnormality configuration of MDT according to claim 1, wherein when the MDT-measurement execution object comprises the user equipment, the MDT measurement condition comprises at least one of following:
   whether or not the user equipment supports a UE measurement list in the MDT-tracking report information;
   whether or not the user equipment is in an area specified by an MDT measurement area parameter in the MDT-tracking report information;
   whether or not a Public Land Mobile Network (PLMN) selected by the user equipment is in an MDT PLMN list in the MDT-tracking report information;
   whether or not the user equipment supports an MDT measurement type in the MDT-tracking report information;
   whether or not a location of the user equipment is within a service range of the base station.

3. The method of processing abnormality configuration of MDT according to claim 1, wherein, when the MDT-measurement execution object comprises the base station, the MDT measurement condition comprises:
   whether or not the base station supports a base-station measurement list in the MDT-tracking report information.

4. The method of processing abnormality configuration of MDT according to claim 1, wherein
   the cause for the failure of MDT-measurement configuration failure comprises a cause for failure of MDT-measurement configuration of the user equipment.

5. The method of processing abnormality configuration of MDT according to claim 1, wherein when the MDT-measurement execution object does not satisfy the MDT measurement condition, the method further comprises:
   activating the MDT-measurement execution object to perform MDT measurement if the MDT-measurement execution object is converted, within a preset time duration, from not satisfying the MDT measurement condition to satisfying the MDT measurement condition.

6. The method of processing abnormality configuration of MDT according to claim 1, further comprising:
   if the user equipment does not satisfy the MDT measurement condition and the base station knows that the user equipment hands over from an original Distributed Unit (DU) to a target DU, resending the first information related to MDT-measurement configuration to the user equipment by a Centralized Unit (CU) corresponding to the base station within a coverage area of the target DU; or, forwarding the first information related to MDT-measurement configuration to the target DU by the CU or the original DU, so that the target DU sends the first information related to MDT-measurement configuration to the user equipment.

7. The method of processing abnormality configuration of MDT according to claim 6, wherein sending, by the base station to the network operation-administration-and-management entity or the network node, information about failure of MDT-measurement configuration and information about forwarding the MDT-tracking report information to the target base station comprises:
   sending, to the network operation-administration-and-management entity or the network node by the CU or the original DU, information about failure of MDT-measurement configuration and information about forwarding the first information related to MDT-measurement configuration to the target DU.

8. A base station, comprising:
   a processor, a storage, and a computer program stored on the storage and executable by the processor, wherein when the computer program is executed by the processor, the processor implements a method of processing abnormality configuration of Minimization of Drive-Test (MDT) comprising following steps:

receiving first information related to MDT-measurement configuration sent by a network operation-administration-and-management entity or a network node of a core network, wherein the first information related to MDT-measurement configuration comprises at least MDT-tracking report information;

activating an MDT-measurement execution object to perform MDT measurement if the MDT-measurement execution object satisfies an MDT measurement condition;

not activating the MDT-measurement execution object to perform MDT measurement if the MDT-measurement execution object does not satisfy the MDT measurement condition;

wherein the MDT-measurement execution object comprises the base station and/or a user equipment (UE), the method further comprises:

forwarding the MDT-tracking report information to a target base station if the user equipment does not satisfy the MDT measurement condition and the base station knows that the user equipment hands over to the target base station; and sending, by the base station to the network operation-administration-and-management entity or the network node, information about failure of MDT-measurement configuration and information about forwarding the MDT-tracking report information to the target base station, wherein the information about failure of MDT-measurement configuration carries a cause for the failure of MDT-measurement configuration.

9. The base station according to claim 8 wherein when the MDT-measurement execution object comprises the user equipment, the MDT measurement condition comprises at least one of following:

whether or not the user equipment supports a UE measurement list in the MDT-tracking report information;

whether or not the user equipment is in an area specified by an MDT measurement area parameter in the MDT-tracking report information;

whether or not a Public Land Mobile Network (PLMN) selected by the user equipment is in an MDT PLMN list in the MDT-tracking report information;

whether or not the user equipment supports an MDT measurement type in the MDT-tracking report information;

whether or not a location of the user equipment is within a service range of the base station.

10. The base station according to claim 8, wherein, when the MDT-measurement execution object comprises the base station, the MDT measurement condition comprises:

whether or not the base station supports a base-station measurement list in the MDT-tracking report information.

11. The base station according to claim 8, wherein, the cause for the failure of MDT-measurement configuration failure comprises a cause for failure of MDT-measurement configuration of the user equipment.

12. The base station according to claim 8, wherein when the MDT-measurement execution object does not satisfy the MDT measurement condition, when the computer program is executed by the processor, the processor further implements a following step:

activating the MDT-measurement execution object to perform MDT measurement if the MDT-measurement execution object is converted, within a preset time duration, from not satisfying the MDT measurement condition to satisfying the MDT measurement condition.

13. The base station according to claim 8, wherein when the computer program is executed by the processor, the processor further implements a following step:

if the user equipment does not satisfy the MDT measurement condition and the base station knows that the user equipment hands over from an original Distributed Unit (DU) to a target DU, resending the first information related to MDT-measurement configuration to the user equipment by a Centralized Unit (CU) corresponding to the base station within a coverage area of the target DU; or, forwarding the first information related to MDT-measurement configuration to the target DU by the CU or the original DU, so that the target DU sends the first information related to MDT-measurement configuration to the user equipment.

14. The base station according to claim 13, wherein sending, by the base station to the network operation-administration-and-management entity or the network node, information about failure of MDT-measurement configuration and information about forwarding the MDT-tracking report information to the target base station comprises:

sending, to the network operation-administration-and-management entity or the network node by the CU or the original DU, information about failure of MDT-measurement configuration and information about forwarding the first information related to MDT-measurement configuration to the target DU.

* * * * *